United States Patent [19]
L'Eplattenier et al.

[11] 3,875,200
[45] Apr. 1, 1975

[54] NEW BIS-2-AZOMETHINE PIGMENTS, PROCESS FOR THEIR MANUFACTURE AND THEIR USE

[75] Inventors: François L'Eplattenier, Therwil; André Pugin, Riehen; Laurent Vuitel, Therwil, all of Switzerland

[73] Assignee: Ciba-Geigy Corp., Ardsley, N.Y.

[22] Filed: June 13, 1973

[21] Appl. No.: 369,671

[30] Foreign Application Priority Data
June 19, 1972 Switzerland............... 9190/72

[52] U.S. Cl. ...... 260/439 R, 260/429 R, 260/429 C, 260/429.9, 260/438.1, 260/465 D, 260/465 F, 260/465 E, 260/469, 260/471 H, 260/473 R, 260/515 P, 260/518 R, 260/519, 260/520, 260/556 B, 260/565 S, 260/558 R, 260/559 R, 260/566 R
[51] Int. Cl......... C07f 15/04, C07f 3/08, C07f 1/08
[58] Field of Search ........ 260/439 R, 429 R, 429 C, 260/438.1, 429.9; 106/288 Q

[56] References Cited
UNITED STATES PATENTS

| | | | |
|---|---|---|---|
| 2,993,065 | 7/1961 | Kumins et al. | 260/439 R |
| 3,393,178 | 7/1968 | Lynch et al. | 260/40 |
| 3,398,170 | 8/1968 | Cyba et al. | 260/439 R |
| 3,440,254 | 4/1969 | Lenoir et al. | 260/249 R |
| 3,441,578 | 4/1969 | Dimroth | 260/249 R |
| 3,457,301 | 7/1969 | Lenoir et al. | 106/288 Q |
| 3,472,876 | 10/1969 | Klein | 260/439 R |
| 3,687,991 | 8/1972 | Gaeng et al. | 260/429.9 |

*Primary Examiner*—Arthur P. Demers
*Attorney, Agent, or Firm*—Vincent J. Cavalieri

[57] ABSTRACT

Bis-azomethine pigments of the formula

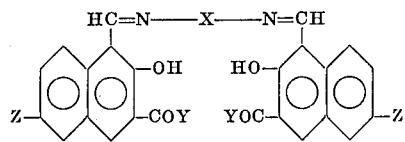

wherein X denotes an aromatic radical on which the imino groups are in the o-position, Y denotes a hydroxyl, alkoxy, cycloalkoxy, aralkoxy or aryloxy, amino, alkylamino or arylamino group and Z denotes a H or halogen atom or an alkoxy, nitro or nitrile group, the radical X having to be free of nitro groups if Y denotes an arylamino group and Z denotes a H atom, as well as metal complexes of these bisazomethines are useful for coloring plastics and lacquers in yellow to red shades of good fastness properties.

3 Claims, No Drawings

NEW BIS-2-AZOMETHINE PIGMENTS, PROCESS FOR THEIR MANUFACTURE AND THEIR USE

It has been found that new, valuable bis-azomethine pigments of the formula

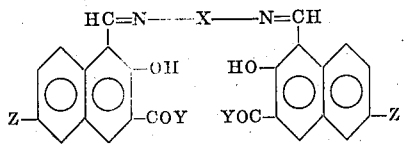

wherein X denotes an aromatic radical on which the imino groups are in the o-position, Y denotes a hydroxyl, alkoxy, cycloalkoxy, aralkoxy or aryloxy, amino, alkylamino or arylamino group and Z denotes a H or halogen atom or an alkoxy, nitro or nitrile group, the radical X having to be free of nitro groups if Y denotes an arylamino group and Z denotes a H atom, as well as metal complexes of these azomethines are obtained if an aldehyde of the formula

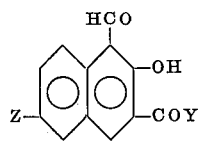

is condensed in the molar ratio of 2:1 with an appropriate diamine of the formula $$H_2N-X-NH_2$$

and the resulting bis-azomethine is metallised if desired.

Dyestuffs of particular interest are those of the formula

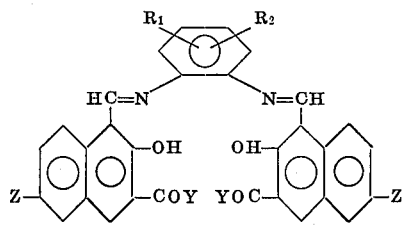

wherein $R_1$ and $R_2$ denote H or halogen atoms, lower alkyl, alkoxy, acyl, alkylsulphonyl, alkoxycarbonyl or alkanoylamino groups, carboxyl, carbamoyl or nitrile groups of phenyl, phenoxy or phenylmercapto groups which are optionally substituted by halogen atoms or lower alkyl or alkoxy groups, and wherein the radicals $R_1$ and $R_2$ together form a fused benzene ring or heteroring and Y and Z have the indicated meaning, with Y preferably denoting a hydroxyl group or, if $R_1$ and $R_2$ do not denote nitro groups, a radical of the formula

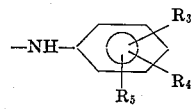

wherein $R_3$ and $R_4$ denote H or halogen atoms, lower alky, alkoxy, alkoxycarbonyl, alkylsulphonyl or alkanoylamino groups, trifluoromethyl or nitro groups or phenoxy or phenylmercapto groups which are optionally substituted by halogen atoms or lower alkyl or alkoxy groups, or wherein the radicals $R_3$ and $R_4$ together form a fused benzene ring and $R_5$ is a H or halogen atom or a lower alkyl group.

Possible starting substances are the 1-formyl-2-hydroxynaphthalene-3-carboxylic acids, their esters, especially with lower aliphatic, araliphatic or alicyclic alcohols or with phenols, their amides, alkylamides or arylamides, especially those of the formula

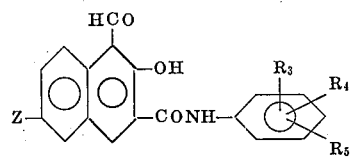

wherein Z has the indicated meaning, $R_3$ and $R_4$ denote H or halogen atoms, lower alkyl, alkoxy, alkoxycarbonyl, alkylsulphonyl or alkanoylamino groups, trifluoromethyl or nitro groups or phenoxy or phenylmercapto groups which are optionally substituted by halogen atoms or lower alkyl or alkoxy groups, or the radicals $R_3$ and $R_4$ together form a fused benzene ring, and $R_5$ is a H or halogen atom or a lower alkyl group.

The aldehydes which serve as starting substances are in most cases unknown compounds.

As examples there may be mentioned: 1-formyl-2-hydroxynaphthalene-3-carboxylic acid, 1-formyl-6-bromo-2-hydroxynaphthalene-3-carboxylic acid, 1-formyl-6-methoxy-2-hydroxynaphthalene-3-carboxylic acid, 1-formyl-2-hydroxynaphthalene-3-carboxylic acid methyl ester, 1-formyl-2-hydroxynaphthalene-3-carboxylic acid ethyl ester, 1-formyl-2-hydroxynaphthalene-3-carboxylic acid propyl ester, 1-formyl-2-hydroxynaphthalene-3-carboxylic acid butyl ester, 1-formyl-2-hydroxynapthalene-3-carboxylic acid β-ethoxyethyl ester, 1-formyl-2-hydroxynaphthalene-3-carboxylic acid phenyl ester, 1-formyl-2-hydroxynaphthalene-3-carboxylic acid benzyl ester, 1-formyl-2-hydroxynaphthalene-3-carboxylic acid amide, 1-formyl-2-hydroxynaphthalene-3-carboxylic acid methylamide, 1-formyl-2-hydroxynaphthalene-3-carboxylic acid ethylamide, 1-formyl-2-hydroxynaphthalene-3-carboxylic acid dimethylamide, 1-formyl-2-hydroxynaphthalene-3-carboxylic acid phenylamide, 1-formyl-2-hydroxynaphthalene-3-carboxylic acid 2'-chlorophenylamide, 1-formyl-2-hydroxynaphthalene-3-carboxylic acid 4'-chlorophenylamide, 1-formyl-2-hydroxynaphthalene-3-carboxylic acid 2',5'-dichlorophenylamide, 1-formyl-2-hydroxynaphthalene-3-carboxylic acid 2'-methylphenylamide, 1-formyl-2-hydroxynaphthalene-3-carboxylic acid 3'-methylphenylamide, 1-formyl-2-hydroxynaphthalene-3-carboxylic acid 4'-methylphenylamide, 1-formyl-2-hydroxynaphthalene-3-carboxylic acid 2',4'-di-methylphenylamide, 1-formyl-2-hydroxynaphthalene-3-carboxylic acid 2',5'-dimethylphenylamide, 1-formyl-2- hydroxynaphthalene-3-carboxylic acid 2'-methyl-4'-chlorophenylamide, 1-formyl-2-hydroxynaphthalene-3-carboxylic acid 2'-methyl-3'-chlorophenylamide, 1-formyl-2-hydroxynaphthalene-3-carboxylic acid 2'-methoxyphenylamide, 1-formyl-2-hydroxynaphthalene-3-carboxylic acid 4'-methoxyphenylamide, 1-formyl-2-hydroxynaphthalene-3-carboxylic acid 2'-ethoxyphenylamide, 1-formyl-2-hydroxynaphthalene-3-carboxylic acid 4'-ethoxyphenylamide, 1-formyl-2-hydroxynaphthalene-3-carboxylic acid 2',5'-dimethoxyphenylamide, 1-formyl-2-hydroxynaphthalene-3-carboxylic acid 2'-methoxy-5'-chlorophenylamide, 1-formyl-2-hydroxynaphthalene-3-carboxylic acid 2',4'-dimethoxy-5'-chlorophenylamide, 1-formyl-2-hydroxynaphthalene-3-carboxylic acid 2',5'-dimethoxy-4'-chlorophenylamide, 1-formyl-6-bromo-2-hydroxynaphthalene-3-carboxylic acid phenylamide and 1-formyl-2-hydroxynaphthalene-3-carboxylic acid α-naphthylamide.

1-Formyl-2-hydroxynaphthalene-3-carboxylic acid is a known compound which is obtained by formylation of 2,3-hydroxynaphthalene carboxylic acid.

The 1-formyl-2-hydroxynaphthalene-3-carboxylic acid esters are new and can be obtained by reaction of 1-formyl-2-hydroxynaphthalene-3-carboxylic acid with thionyl chloride to give 1-formyl-2-hydroxynaphthalene-3-carboxylic acid chloride and reaction of the latter with an alcohol or phenol.

The 1-formyl-2-hydroxynaphthalene-3-carboxylic acid anilides are partly known and can be obtained by reaction of 1-formyl-2,3-hydroxynaphthalic acid with thionyl chloride to give the acid chloride, condensation of the latter with an aminobenzene to give the anil of the 1-formyl-2,3-hydroxynaphthalene carboxylic acid anilide and hydrolysis of the latter to give the 1-formyl-2,3-hydroxynaphthalene carboxylic acid anilide.

The new 1-formyl-2,3-hydroxynapthalene carboxylic acid alkylamides can be obtained analogously.

Possible aromatic diamines are both carbocyclic and heterocyclic aromatic 1,2-diamines, preferably o-phenylenediamines and especially those of the formula

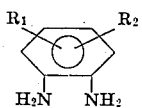

wherein $R_1$ and $R_2$ have the abovementioned meaning.

As examples of aromatic diamines there may be mentioned: 1,2-phenylenediamine, 4-chloro-1,2-phenylenediamine, 4,5-dichloro-1,2-phenylenediamine, 4-methyl-1,2-phenylenediamine, 4,5-dimethyl-1,2-phenylenediamine, 3,5-dimethyl-1,2-phenylenediamine, 4-methoxy-1,2-phenylenediamine, 4-phenoxy-1,2-phenylenediamine, 4-methylsulphonyl-1,2-phenylenediamine, 4-ethylsulphonyl-1,2-phenylenediamine, 4-carboxy-1,2-phenylenediamine, 4-methoxycarbonyl-1,2-phenylenediamine, 4-ethoxycarbonyl-1,2-phenylenediamine, 4-butoxycarbonyl-1,2-phenylenediamine, 4-hexyloxycarbonyl-1,2-phenylenediamine, 4-octyloxycarbonyl-1,2-phenylenediamine, 4-cyano-1,2-phenylenediamine, 4-acetylamino-1,2-phenylenediamine, 4-benzoylamino-1,2-phenylenediamine, 3,4-diaminodiphenyl, 1,2-diaminonaphthalene, 2,3-diaminonaphthalene, 1,2-diamino-5,6,7,8-tetrahydronaphthalene, 2,3-diamino-5,6,7,8-tetrahydronaphthalene, 1,2-diaminoanthraquinone, 2,3-diaminoanthraquinone, 9,10-diaminophenanthrene, 5,6-diaminoacenaphthene, 3,4-diaminopyridine, 2,3-diaminodiphenylene oxide, 2,3-diaminoquinoxaline and 2-methyl-5,6-diaminobenzimidazole.

The condensation of the aldehyde with the diamine is appropriately carried out in water or in organic solvent at elevated temperature, preferably between 50°C and the boiling point of the solvent used. As examples of solvents there may be mentioned: water, alcohol, glacial acetic acid, dioxane, dimethylformamide, N-methylpyrrolidone, butyrolactone, glycol monomethyl ether, xylene, chlorobenzene, o-dichlorobenzene, nitrobenzene or mixtures thereof.

Since the bis-azomethines obtained are sparingly soluble in the solvents mentioned, they can easily be isolated by filtration. Any impurities can be removed by elution.

For conversion into the metal complexes, the resulting bis-azomethines are treated with agents which release divalent metals, for example with salts of zinc or cadmium, but especially of copper and above all of nickel. Preferably, the formates, acetates or stearates of these metals are used. The metallisation is appropriately carried out in one of, or in a mixture of, the abovementioned solvents.

The metallisation can be also be carried out simultaneously with the condensation by condensing the aldehyde together with the diamine in one of the abovementioned solvents in the presence of metal salts.

The metal complexes obtained preferably correspond to the formula

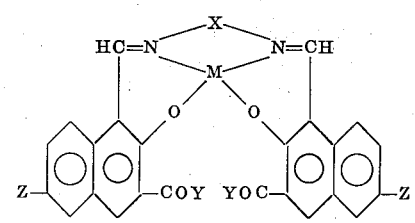

wherein X, Y and Z have the abovementioned meaning and M denotes a divalent metal atom.

Metal complexes of particular interest are those of the formula

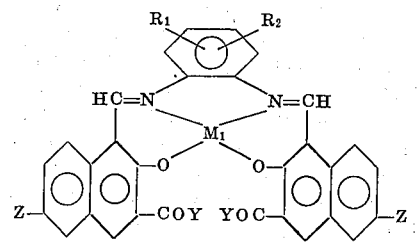

wherein $M_1$ denotes a nickel or copper atom and $R_1$, $R_2$, Y and Z have the abovementioned meaning.

The new dyestuffs represent valuable pigments which can be used in a finely divided form for pigmenting high molecular organic material, for example cellulose ethers and cellulose esters, such as ethylcellulose, cellulose acetate, cellulose butyrate, natural resins or synthetic resins, such as polymerisation resins or polycondensation resins, for example aminoplasts, especially urea-formaldehyde and melamine-formaldehyde resins, alkyd resins, phenoplasts, polycarbonates, polyesters, polyamides or polyurethanes, polyolefines, such as polyethylene or polypropylene, polyvinyl chloride, polystyrene, polyacrylonitrile, polyacrylic acid esters, rubber, casein, silicones and silicone resins, individually or as mixtures.

It is immaterial whether the high molecular compounds mentioned are in the form of plastic masses or melts or in the form of spinning solutions, lacquers, paints or printing inks. It proves advantageous to use the new pigments as toners or in the form of preparations, depending on the application.

In addition to the pure pigment the preparations can, for example, additionally contain natural resins, such as abietic acid or its esters, ethylcellulose, cellulose acetobutyrate, alkaline earth metal salts of higher fatty acids, fatty amines, such as stearylamine or rosin amine, vinyl chloride vinyl acetate copolymers, polyacrylonitrile or polyterpene resins or water-soluble dyestuffs, for example dyestuff-sulphonic acids or their alkaline earth metal salts.

In the examples which follow the parts denote parts by weight, unless otherwise stated.

EXAMPLE 1

3.50 g (0.012 mol) of 1-formyl-2-hydroxy-3-naphthoic acid anilide are suspended in 60 ml of alcohol or glacial acetic acid and a solution of 0.64 g (0.006 mol) of o-phenylenediamine in 20 ml of alcohol or glacial acetic acid is added. After refluxing for 3 hours, the orange suspension is filtered hot. The filter residue is boiled in 50 ml of methylcellosolve for 1 hour at 100°C. After cooling to 20°C, the mixture is filtered and the residue is washed with water, alcohol and acetone. 3.45 g (88% of theory) of an orange pigment of the formula

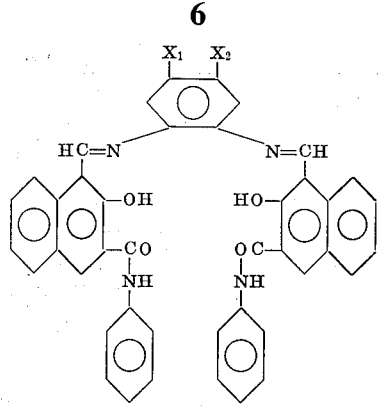

wherein $X_1$ and $X_2$ = H, are obtained.

1-Formyl-2-hydroxy-3-naphthoic acid anilide used in Example 1 can be obtained as follows:

32.4 g (0.150 mol) of 1-formyl-2-hydroxy-3-naphthoic acid in 375 ml of chloroform are carefully treated with 150 ml of thionyl chloride and the mixture is warmed to the boil. After one hour, the reaction mixture is evaporated on a rotary evaporator, the residue is taken up in 300 ml of petroleum ether, the mixture is stirred for 5 minutes and the product is filtered off. The acid chloride thus obtained is well washed with petroleum ether and redissolved in 350 ml of chloroform. After adding 41.0 ml (0.450 mol) of aniline dissolved in 50 ml of chloroform, the reaction mixture is stirred for 15 minutes and evaporated in vacuo, and the residue is stirred in water. It is then filtered off and the filter residue is well washed with water and dissolved in 1.5 litres of ethylcellosolve. 50 ml of concentrated hydrochloric acid are added dropwise to this solution and the mixture is then heated for 10 minutes under reflux. After cooling, the amide which has crystallised out is filtered off, washed with alcohol and dried. 24.5 g (56.2% of theory) of a yellowish analytically pure substance are obtained (melting point 217°C).

The aldehydes used in Examples 2, 3, 4 and 5 (Table I) can be obtained analogously.

EXAMPLES 2–6

If the procedure indicated in Example 1 is followed but using, instead of 0.012 mol of 1-formyl-2-hydroxy-3-naphthoic acid anilide, the amounts of aldehyde indicated in the table which follows, similar pigments are obtained, with the colour and yield indicated in Table I.

TABLE I

| Example number | Aldehyde | Mols of aldehyde | $X_1$ | $X_2$ | Yield, percent | Shade in PVC |
| --- | --- | --- | --- | --- | --- | --- |
| 2 | ![CHO-OH-CONH-aryl-CH3-Cl] | 0.014 | —H | —H | 95 | Yellow. |
| 3 | ![CHO-OH-CONH-aryl-OCH3-OCH3-Cl] | 0.020 | —H | —H | 88 | Do. |
| 4 | ![CHO-OH-CONH-aryl-CH3] | 0.020 | —Cl | —Cl | 91 | Do. |

TABLE I— Continued

| Example number | Aldehyde | Mols of aldehyde | $X_1$ | $X_2$ | Yield, percent | Shade in PVC |
|---|---|---|---|---|---|---|
| 5 | (1-CHO, 2-OH, 3-CONH-C6H4-Cl naphthalene) | 0.020 | —Cl | —Cl | 86 | Do. |
| 6 | (1-CHO, 2-OH, 3-OCCOH3 naphthalene) | 0.040 | —H | —H | 83 | Do. |

1-Formyl-2-hydroxy-3-naphthoic acid methyl ester, used in Example 6, is obtainable as follows: 64.8 g (0.30 mol) of 1-formyl-23-naphthoic acid are suspended in 200 ml of methylene chloride and 29ml of thionyl chloride are added. After refluxing for 2 hours the reaction mixture is evaporated on a rotary evaporator. The acid chloride thus obtained is well washed with petroleum ether and taken up in 300 ml of methylene chloride. After addition of 100 ml (2.48 mols) of methanol and 24 ml of pyridine (0.30 mol), the reaction mixture is stirred for 1 hour under reflux and then evaporated in a rotary evaporator. The residue is well washed with water and recrystallised from n-butanol. 42.6 g (61.8% of theory) of a yellow analytically pure substance are obtained (melting point 140°-141°C).

EXAMPLE 7

1.50 g (0.002 mol) of the azomethine from Example 2 are dissolved in 50 ml of dimethylformamide and the solution is warmed with 0.50 g (0.002 mol) of nickel-II acetate tetrahydrate for 2 hours to 70°C. After cooling, the red-brown precipitate is filtered off and washed with dimethylformamide, alcohol, water and acetone. 1.15 g (72% of theory) of a red-brown pigment of the formula

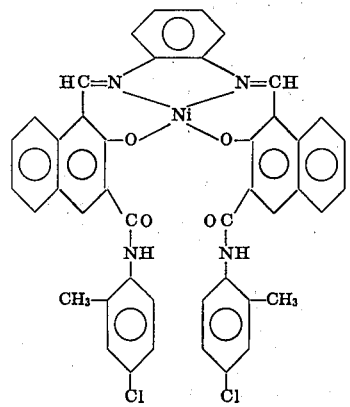

are obtained.

EXAMPLES 8 – 44

Further azomethine metal complexes are obtained when bis-azomethines of the formula

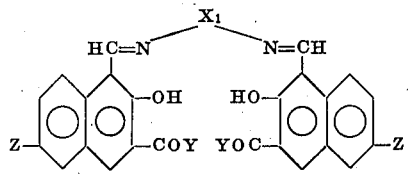

wherein $X_1$, Y and Z have the meaning indicated in Columns 2 to 4 of Table II which follows, are metallised, in the molar amount indicated in Column 6, with the metal indicated in Column 5, in accordance with the instructions of Example 4. Column 7 indicates the yield and Column 8 the shade of the resulting colouration in polyvinyl chloride.

TABLE II

| 1 | 2 | 3 | 4 | 5 | 6 | 7 | 8 |
|---|---|---|---|---|---|---|---|
| Example No. | $X_1$ | Y | Z | $M^{+2}$ | Mol | Yield, percent | Shade in PVC |
| 8 | (phenyl) | —OH | H | Ni | 0.005 | 88 | Red-brown. |
| 9 | Same as above | OH | H | Cu | 0.005 | 88 | Yellow-brown. |
| 10 | do | OH | H | Zn | 0.005 | 85 | Yellow. |
| 11 | (CH3-phenyl) | OH | H | Ni | 0.003 | 69 | Orange. |
| 12 | Same as above | OH | H | Cu | 0.003 | 92 | Yellow-brown. |

| Example No. | $X_1$ | Y | Z | $M^{+2}$ | Mol | Yield, percent | Shade in PVC |
|---|---|---|---|---|---|---|---|
| 13 | phenyl-COOH | OH | H | Ni | 0.003 | 80 | Orange. |
| 14 | Same as above | OH | H | Cu | 0.003 | 90 | Brown. |
| 15 | phenyl-$OC_2H_5$ | OH | H | Ni | 0.003 | 85 | Red-brown. |
| 16 | phenyl-$OC_2H_5$ | OH | H | Cu | 0.003 | 65 | Do. |
| 17 | Same as above | OH | H | Zn | 0.003 | 87 | Yellow. |
| 18 | biphenyl | OH | H | Ni | 0.003 | 91 | Orange. |
| 19 | Same as above | OH | H | Cu | 0.003 | 94 | Do. |
| 20 | diphenyl ether | OH | H | Ni | 0.003 | 89 | Brown. |
| 21 | Same as above | OH | H | Cu | 0.003 | 88 | Yellow. |
| 22 | phenyl | OH | $-NO_2$ | Ni | 0.004 | 95 | Do. |
| 23 | Same as above | OH | Br | Ni | 0.0025 | 87 | Orange. |
| 24 | do | OH | Br | Zn | 0.0025 | 86 | Yellow. |
| 25 | phenyl-Cl, Cl | OH | H | Ni | 0.005 | 91 | Red. |
| 26 | Same as above | OH | H | Cu | 0.005 | 95 | Yellow-brown. |
| 27 | do | OH | H | Zn | 0.003 | 89 | Yellow. |
| 28 | Same as above | $-NH-$phenyl | H | Ni | 0.002 | 99 | Red. |
| 29 | do | Same as above | H | Cu | 0.0035 | 76 | Brown. |
| 30 | do | do | H | Zn | 0.0035 | 71 | Orange. |
| 31 | phenyl-COOH | do | H | Cu | 0.0025 | 92 | Do. |
| 32 | phenyl-$CH_3$, $CH_3$ | do | H | Ni | 0.004 | 71 | Do. |
| 33 | phenyl-Cl, Cl | do | H | Ni | 0.004 | 83 | Do. |
| 34 | Same as above | $-NH-$phenyl$-CH_3$ | H | Ni | 0.002 | 93 | Red. |
| 35 | do | $-NH-$phenyl$-Cl$ | H | Ni | 0.002 | 94 | Orange. |

| Example No. | X₁ | Y | Z | M⁺² | Mol | Yield, percent | Shade in PVC |
|---|---|---|---|---|---|---|---|
| 36 | Same as above | —NH—⟨C₆H₃(CH₃)⟩—Cl | H | Cu | 0.0025 | 79 | Brown. |
| 37 | do | Same as above | H | Zn | 0.002 | 96 | Yellow. |
| 38 | do | do | H | Cd | 0.0013 | 100 | Do. |
| 39 | do | —NH—⟨C₆H₃(CH₃O)(Cl)⟩—OCH₃ | H | Ni | 0.002 | 68 | Do. |
| 40 | (naphthyl) | —NH—⟨C₆H₃(CH₃O)(Cl)⟩—OCH₃ | H | Cu | 0.002 | 67 | Brown. |
| 41 | Same as above | Same as above | H | Zn | 0.002 | 76 | Yellow. |
| 42 | do | —OCH₃ | H | Ni | 0.003 | 95 | Orange. |
| 43 | do | —OCH₃ | H | Cu | 0.003 | 95 | Yellow-brown. |
| 44 | Cl Cl (dichlorophenyl) | —OCH₃ | H | Ni | 0.004 | 76 | Brown. |

The metal complexes which are mentioned in Examples 7 to 44 can be manufactured in one step by reacting the 1-formyl-2-hydroxy-3-naphthoic acid or 1-formyl-2-hydroxy-3-naphthoic acid arylides and 1-formyl-2-hydroxynaphthoic acid methyl ester with the diamine in the presence of the metal ion and in a solvent such as alcohol, methylcellosolve, dioxane, glacial acetic acid or dimethylformamide.

EXAMPLE 45

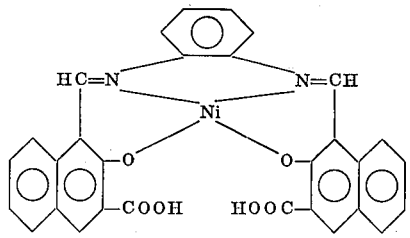

4.32 g (0.02 mol) of 1-formyl-2-hydroxy-3-naphthoic acid, 1.08 g (0.01 mol) of o-phenylenediamine and 2.50 g (0.01 mol) of nickel(II) acetate tetrahydrate are suspended in 100 ml of glacial acetic acid and the mixture is boiled for 30 minutes under reflux. A thick orange precipitate forms. Ater cooling, the product is filtered off and washed with glacial acetic acid, alcohol, water and acetone. 4.20 g (75% of theory) of a red-brown pigment, which is identical with the product of Example 8, are obtained.

EXAMPLE 46

65 parts of stablised polyvinyl chloride, 35 parts of dioctyl phthalate and 0.2 part of the dyestuff obtained according to Example 1 are stirred together and then milled for 7 minutes at 140°C on a two-roll calender. An orange-coloured sheet of good fastness to light and to migration is obtained.

We claim:

1. A bis-azomethine pigment of the formula

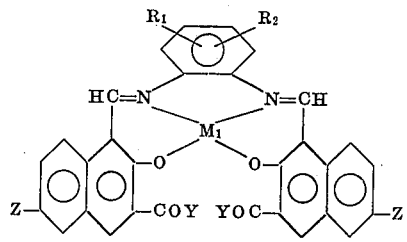

wherein M₁ is nickel, copper, zinc or cadmium, R₁ and R₂ are hydrogen, chloro, lower alkyl, lower alkoxy, phenyl, phenoxy, or wherein R₁ and R₂ together form a fused benzene ring, Y is amino, alkylamino or arylamino and Z is hydrogen, chloro, or lower alkoxy.

2. A bis-azomethine pigment according to claim 1 wherein Y is

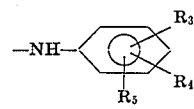

wherein R₃ and R₄ are hydrogen, halogen, lower alkyl, lower alkoxy, trifluoromethyl or phenoxy, or R₃ and R₄ together form a fused benzene ring, and R₅ is hydrogen, halogen or lower alkyl.

3. The compound according to claim 1 of the formula

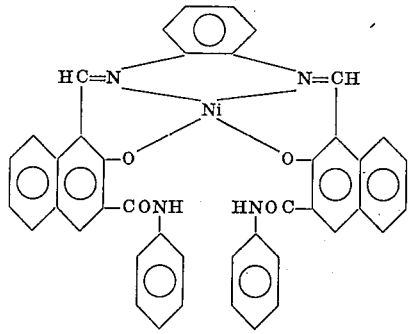

* * * * *